US012182203B2

(12) United States Patent
Bax et al.

(10) Patent No.: US 12,182,203 B2
(45) Date of Patent: Dec. 31, 2024

(54) SYSTEM AND METHOD FOR VERIFIED PREDICTIONS AND PERFORMANCE

(71) Applicant: YAHOO ASSETS LLC, Dulles, VA (US)

(72) Inventors: Eric Bax, Sierra Madre, CA (US); Charlotte Bax, Dulles, VA (US); Lisa Giaffo, Pasadena, CA (US); Melissa Gerber, Dulles, VA (US); Tanisha Sharma, Los Angeles, CA (US); Nikki Thompson, Bloomfield, NJ (US); Kimberley Williams, Dulles, VA (US); Will Wagner, Costa Mesa, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 119 days.

(21) Appl. No.: 17/900,437

(22) Filed: Aug. 31, 2022

(65) Prior Publication Data
US 2024/0070201 A1 Feb. 29, 2024

(51) Int. Cl.
*G06F 16/9032* (2019.01)
*G06N 5/022* (2023.01)

(52) U.S. Cl.
CPC ......... *G06F 16/9032* (2019.01); *G06N 5/022* (2013.01)

(58) Field of Classification Search
None
See application file for complete search history.

(56) References Cited

U.S. PATENT DOCUMENTS

| | | | | |
|---|---|---|---|---|
| 2007/0168342 | A1* | 7/2007 | Singerman | G06F 16/9535 707/999.005 |
| 2021/0334836 | A1* | 10/2021 | Singh | G06N 20/00 |
| 2022/0191005 | A1* | 6/2022 | D'Amore | H04L 9/0643 |
| 2023/0146197 | A1* | 5/2023 | Raman | G06F 40/174 704/9 |

* cited by examiner

*Primary Examiner* — Giuseppi Giuliani
(74) *Attorney, Agent, or Firm* — Venable LLP

(57) ABSTRACT

The present teaching relates to communication related to predictions. A communication chain is created with multiple chain units, each operating independently to provide prediction services related to a prompt with embedded information therein associated with predictions for the prompt to enable prediction services. A request is received for a requested operation related to a query prompt on one of prediction solicitation, prediction entry, verification entry, and prediction access. If a chain unit for the query prompt, the request is directed to the chain unit to perform the requested operation. If not, a new chain unit is created for the query prompt and the request is forwarded to the new chain unit to carry out the requested operation.

20 Claims, 13 Drawing Sheets

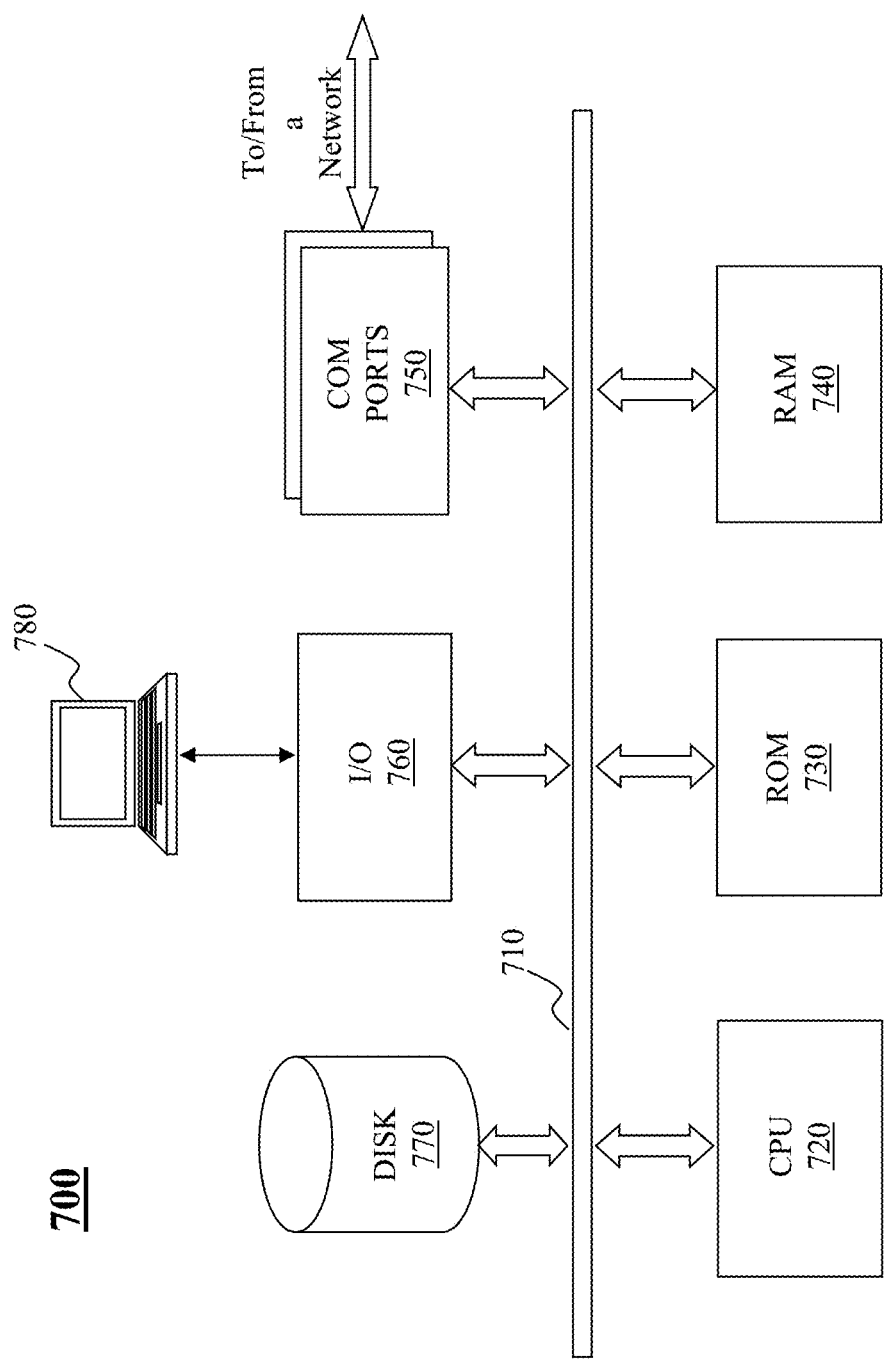

SYSTEM AND METHOD FOR VERIFIED PREDICTIONS AND PERFORMANCE

BACKGROUND

1. Technical Field

The present teaching generally relates to computers. More specifically, the present teaching relates to computer-based communications.

2. Technical Background

Prediction markets have been present but have not been able to have a wide use due to several reasons. First, prediction markets enforce a financial cost for incorrect predictions and given financial reward for correct predictions. The associated financial nature makes the markets similar to gambling or at least ethically frowned upon. In addition, confusion exists on how the cost and payout associated with predictions are to be calculated. There may be other reasons that have prevented prediction markets from having a wide applicability.

With the development of the Internet and the ubiquitous network connections, a large percent of communications is nowadays performed online, whether it is via emails, messaging, social media information exchanges, or voice via wired or wireless connections. Part of such online communications is related to predictions, such as predicting the level of inflation in the next period of time, predicting stock market trends, or predicting an outcome of virtually anything so long as the outcome is presently unknown. With today's ease of information transmission over the network at a rapid spreading speed, online predictions have been consumed at a historic level. However, it is often not easy to distinguish predictions from facts in absence of any indication as such. In addition, without information available as to the truth with respect to a prediction or any information indicative of a level of trustworthiness of the source(s) of a prediction, most predictions spread online likely are blindly consumed. Furthermore, some social media platforms offering predictions may allow a user to post or to erase a prediction, the availability of predictions entered may not always be accessible.

Thus, there is a need for a solution that addresses the challenges discussed above.

SUMMARY

The teachings disclosed herein relate to methods, systems, and programming for information management. More particularly, the present teaching relates to methods, systems, and programming related to enabling services related to predictions and management thereof.

In one example, a method, implemented on a machine having at least one processor, storage, and a communication platform capable of connecting to a network for communication related to predictions. A communication chain is created with multiple chain units, each operating independently to provide prediction services related to a prompt with embedded information therein associated with predictions for the prompt to enable prediction services. A request is received for a requested operation related to a query prompt on one of prediction solicitation, prediction entry, verification entry, and prediction access. If a chain unit for the query prompt, the request is directed to the chain unit to perform the requested operation. If not, a new chain unit is created for the query prompt and the request is forwarded to the new chain unit to carry out the requested operation.

In a different example, a system for communication related to predictions includes a communication chain created with one or more chain units and a prediction service platform. Each chain unit operates independently to provide prediction services related to a prompt and includes embedded information associated with one or more predictions directed to the prompt to facilitate the prediction services. The prediction service platform is implemented by a processor and configured for receiving a request for a requested operation relating to a query prompt, wherein the requested operation includes one of a prediction solicitation, a prediction entry, a verification entry, and a prediction access. If there is a chain unit corresponding to the query prompt, the request is directed to the chain unit to perform the requested operation. If not, a new chain unit is created and added to the communication chain and the request is directed to the new chain unit to carry out the requested operation.

Other concepts relate to software for implementing the present teaching. A software product, in accordance with this concept, includes at least one machine-readable non-transitory medium and information carried by the medium. The information carried by the medium may be executable program code data, parameters in association with the executable program code, and/or information related to a user, a request, content, or other additional information.

Another example is a machine-readable, non-transitory and tangible medium having information recorded thereon for communication related to predictions. The information, when read by the machine, causes the machine to perform the following steps. A communication chain is created with multiple chain units, each operating independently to provide prediction services related to a prompt with embedded information therein associated with predictions for the prompt to enable prediction services. A request is received for a requested operation related to a query prompt on one of prediction solicitation, prediction entry, verification entry, and prediction access. If a chain unit for the query prompt, the request is directed to the chain unit to perform the requested operation. If not, a new chain unit is created for the query prompt and the request is forwarded to the new chain unit to carry out the requested operation.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 7 is an illustrative diagram of an exemplary computing device architecture that may be used to realize a specialized system implementing the present teaching in accordance with various embodiments.

DETAILED DESCRIPTION

Figure 1:
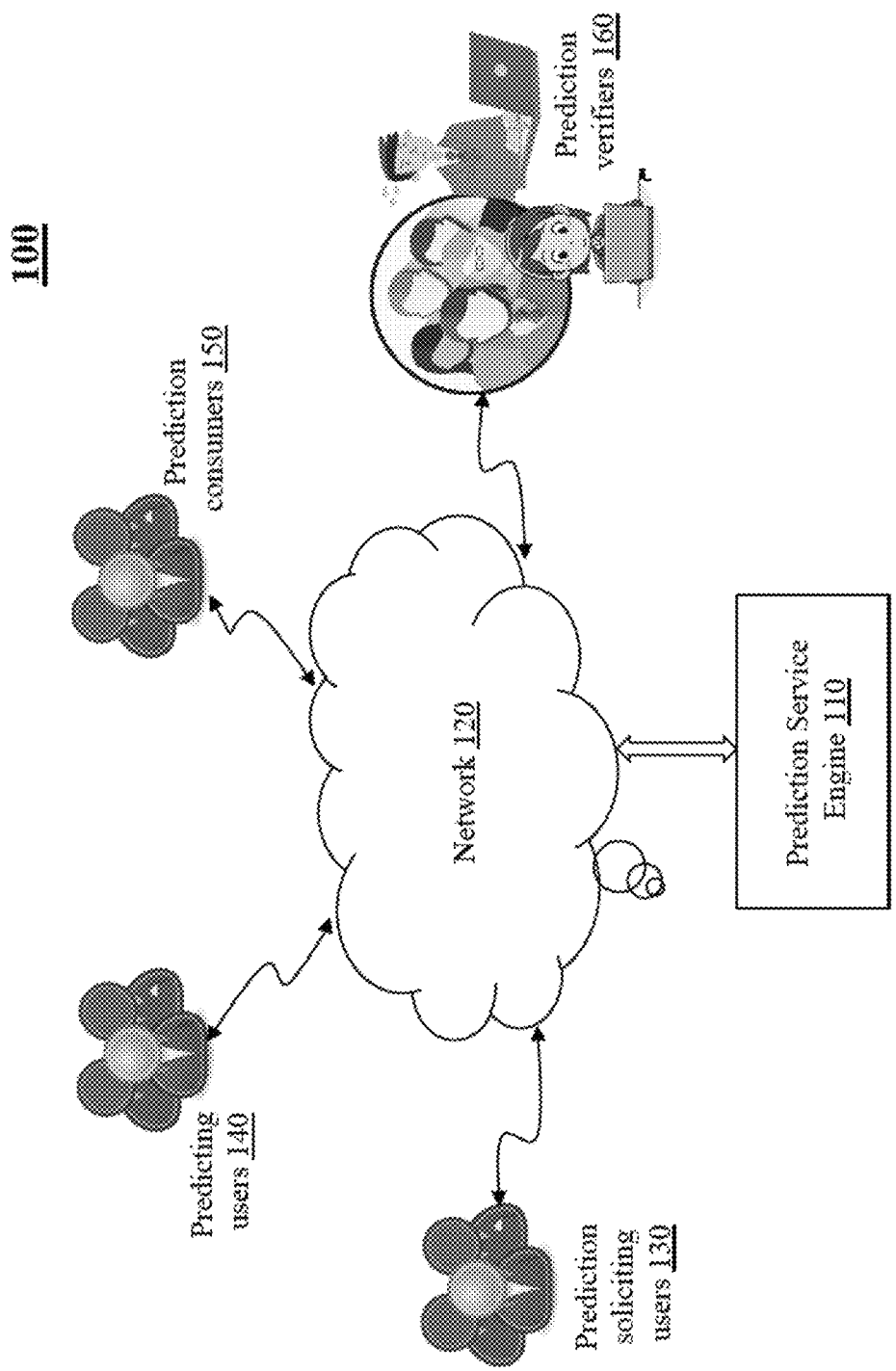
FIG. 1 depicts an exemplary framework for centralized online prediction services, in accordance with an embodiment of the present teaching.

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or system have been described at a relatively high-level, without detail, in order to avoid unnecessarily obscuring aspects of the present teachings.

The present teaching discloses exemplary frameworks for providing prediction related services that addressed challenges in the art. Different frameworks and platforms that may be used to implement the prediction related services are described. In some aspect, a centralized prediction service platform is disclosed that coherently facilitates online users playing different roles with respect to the prediction services to enable different aspects of prediction services. Different users may facilitate, via the centralized platform for prediction related services, to solicit predictions, to offer predictions on different prompts, to verify predictions, and to provide dynamic performance evaluations on predictions/ predictors, and to consume predictions with contextual information provided therewith such as verification and evaluation information.

In another aspect, a decentralized prediction framework is disclosed for providing distributed prediction services according to the present teaching. The decentralized prediction service framework may be implemented using any platform that supports the functionalities associated with decentralized communication services. In some embodiments, the decentralized prediction service framework as disclosed herein according to the present teaching may be realized based on a blockchain platform. With a decentralized framework, services associated with predictions may be provided and managed with respect to each prompt based on which one or more predictions may be provided, verified, accessed, and/or evaluated.

With a prediction service, whether it is realized on a centralized or decentralized platform, different users may interface with the service to provide, enable, or access different functionalities of the service. It may be a user who likes to specify a prompt to solicit predictions on the prompt. A user may also be one who likes to provide predictions to some prompts. A user may also be one who likes to verify, e.g., as to the true or false status of, a prediction and provide an indicator as to the verification result of the corresponding prediction. A user may also be an information consumer who desires to know prediction(s) of one or more prompts. A user may also be one who may evaluate on, e.g., trustworthiness of predictions or levels of confidence in users who provided predictions. Information provided by different types of users with respect to prompts may be provided to consumer users in order to provide a full picture of information associated with predictions.

According to the present teaching, predictions offered by some prediction users may be evaluated via verifications by verifying users so that the predictions may be provided to consumers, upon requests, with corresponding verification and evaluation information. In some embodiments, predictors who provide predictions to one or more prompts may be evaluated based on verification information directed to such provided predictions. Based on such information, prediction users who provided predictions to different prompts may be ranked based on their performance evaluated based on verification results. Such ranking information associated with predictors may also be provided to a consumer user when such predictions are accessed by the consumer. Details related to different aspects of the present teaching are provided below.

FIG. 1 depicts an exemplary centralized framework 100 for centralized online prediction services, in accordance with an embodiment of the present teaching. The illustrated centralized framework 100 comprises a prediction service engine 110 and multiple groups of users of the prediction service, including prediction soliciting users 130, predicting users 140, prediction verifiers 160, and prediction consumers 150. Users 130-160 are connected with the prediction service engine 110 via a network 120 for communications associated with different aspects of prediction related service. In some embodiments, the prediction related services may be offered around prompts, which may be either specified by prediction soliciting users 130 or set up by the prediction service engine 110, e.g., either during initialization or through occasional update to the group of prompts for which predictions are solicited.

With a group of prompts provided as the basis of the prediction service engine 110, predicting users who desire to provide predictions may connect with the prediction service engine 110 via network 120 to access relevant prompts and to provide predictions. In some embodiments, for each prompt accessible from the prediction service engine 110, there may be more than one predicting users to provide predictions. In some embodiments, predictions on a prompt may be associated with the prompt and may be accessed together with the prompt. Prompts with corresponding predictions stored in the prediction service engine 110 may be accessed by prediction consumers 150 for consumption. In some embodiments, for an interested prompt, all predictions associated therewith may be consumed by users through network 120. In some embodiments, predictions associated with an interested prompt may also be accessed with some filtering based on some criterion specified based on, e.g., predictors or confidence level in a predictor.

According to the present teaching, a mechanism is provided by the prediction service engine 110 to facilitate prediction verifiers 160 to verify any prediction made with respect to any prompt accessible from the prediction service engine 110. In some embodiments, a prediction verifier 160 may connect with the prediction service engine 110 to offer verification of a specified prediction and subsequently provide the verification result to the prediction service engine 110. Such a verification result may then be saved with the prediction verified and the prompt for which the verified prediction is provided. Such verification results associated with predictions for different prompts may be used as the basis of evaluating predictions and/or predictors. Prediction consumers 150 connect to the prediction service engine 110 to access predictions of interested prompts. A prediction consumer may access prompts and their predictions. In some embodiment, different types of information associated with prompt/predictions may also be provided to a consumer user, including the names of predictors who provided the predictions, verification result directed to each prediction, as well as, e.g., rankings of predictions according to a level of confidence on each predictor estimated based on, e.g., the verification results.

Figure 2A:
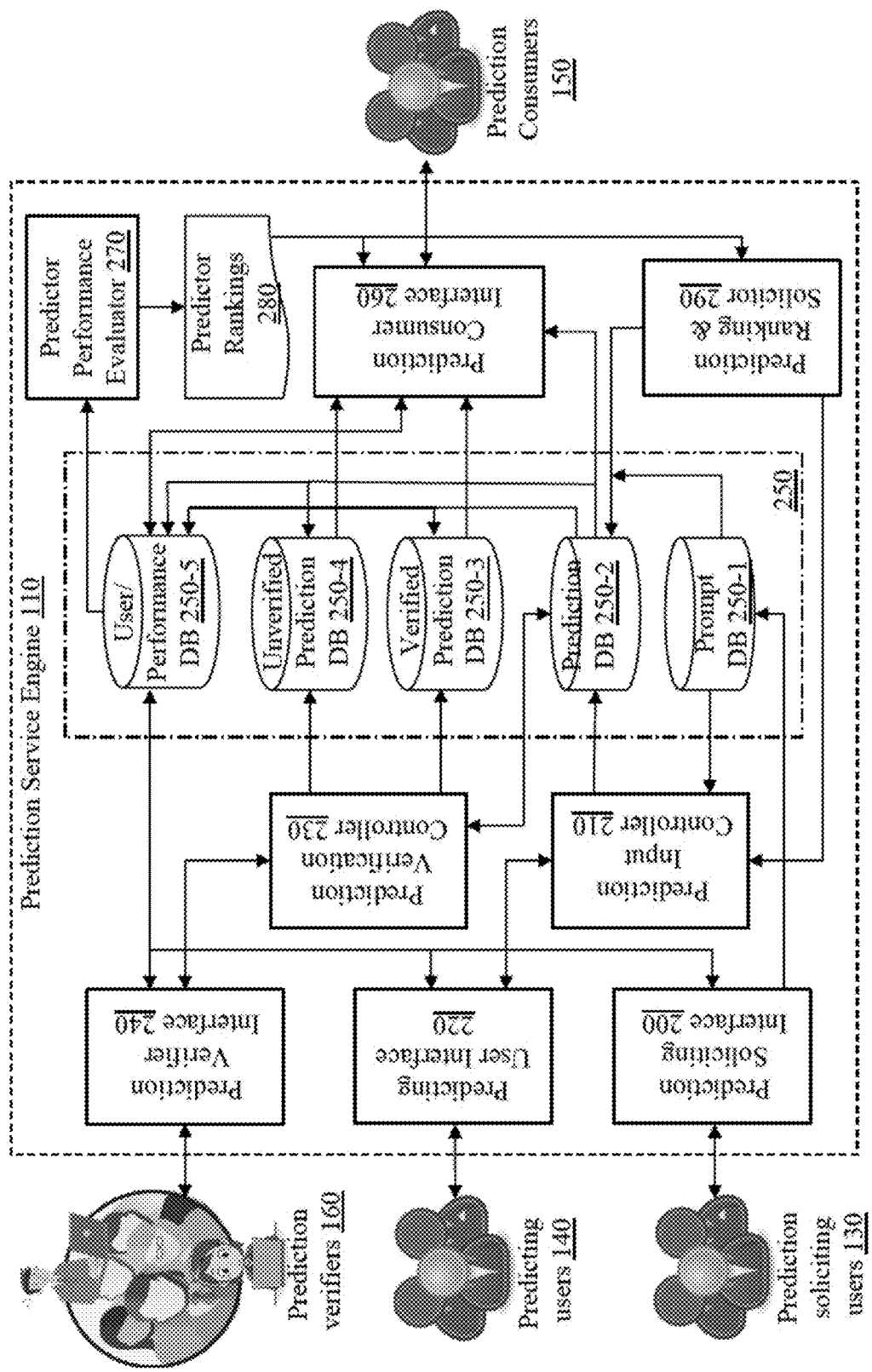
FIG. 2A depicts an exemplary high level system diagram of a prediction service engine, in accordance with an embodiment of the present teaching.

FIG. 2A depicts an exemplary high level system diagram of the prediction service engine 110, in accordance with an embodiment of the present teaching. As discussed herein, the prediction service engine 110 is for providing centralized prediction related services involving different types of users (prediction soliciting users 130, predicting users 140, prediction verifiers 160, and prediction consumers 150). To facilitate the involvement of different types of users in different aspects of the services, the prediction service engine 110 includes multiple GUIs, each of which interacts with a type of users to perform relevant functions. This includes a prediction soliciting interface 200, a predicting user interface 220, a prediction verifier interface 240, and a prediction consumer interface 260. Information from different users may be stored in various databases 250 and accessed to enable different functionalities related to the prediction services. The databases 250 may include a prompt database 250-1 for storing prompts for which predictions are solicited, a prediction database 250-2 for storing predictions provided by different predicting users with respect to different prompts, verification databases 250-3 and 250-4 for storing positively confirmed predictions and not-confirmed predictions. In some embodiments, there may also optionally be a user/performance database 250-5 for storing performance evaluation information, such as statistics of user's participation, verification statistics over each predicting user's predictions, etc.

In operation, whenever a user desires to seek predictions on a prompt, the user may interact with the prediction soliciting interface 200 to enter a prompt, which may be stored in the prompt database 250-1. Each prompt may be associated with an identifier for the user who enters the prompt, which may be an identifier of some commonly referenced online platform such as a social media environment (e.g., Facebook) or an identifier defined by the prediction service engine 110. To obtain predictions of each prompt stored in the prompt database 250-1, the predicting user interface 220 may access, via a prediction input controller 210, prompts stored in the prompt database 250-1, present to predicting users, and solicit predictions. When a prediction is provided by a predicting user via the interface 220, the prediction may be stored in the prediction database 250-2 with relevant information such as content of the prediction, evidentiary support for the prediction, the identity of the predicting user, etc. The prediction related information stored in the prediction database 250-2 may be cross referenced or indexed against the associated prompts in the prompt database 250-1. Through such cross references or indices, each prompt, its predictions (e.g., from different predicting users), and other information (e.g., verification of each prediction as will be explained below) may be organized as logically related group of information even though they may be distributed in different databases or even different locations.

As discussed herein, predictions provided from predicting users may be verified by prediction verifiers 160. To obtain a verification with respect to a prediction, the prediction verifier interface 240 may access, via a prediction verification controller 230, a prediction stored in prediction database 250-2, present it to one or more interested prediction verifiers, and obtain verification results from each of the verifiers. Some of the predictions may be verified as true and some may be unverified. In some situations, some predictions may be verified as false. In some situations, some predictions may not yet be verifiable, e.g., the truth is not yet available, which may also be considered as unverified. In some embodiments, the identities of verifiers may also be provided. In some situations, the verifiers may be screened based on their identifiers.

In some embodiments, verified and unverified predictions may be separately stored in a verified prediction database 250-3, if the verification result is positive, and in an unverified prediction database 250-4, if the prediction is not verified (e.g., either as false or not verifiable). As discussed herein, as each verifier is associated with an identifier, each verification result may also be associated with the identifier of the verifier and may be stored with the verification result in either 250-3 or 250-4. In some embodiments, a verification result stored in either 250-3 and 250-4 may be cross referenced or indexed against a corresponding prediction stored in the prediction database 250-2. Through such cross references, all verification results associated with a prediction may be logically identified and grouped with the prediction to provide contextual information when the prediction is accessed or consumed. A prediction consumer 150 may interact with the prediction consumer interface 260 to search, access, and retrieve any information related to predictions made available in databases 250 by the prediction service engine 110.

Optionally, the prediction service engine 110, as illustrated in FIG. 2A, may also include a predictor performance evaluator 270, which may be invoked when needed to access information/statistics stored in the user performance database 250-5 in order to evaluate the quality of predictors based on, e.g., verification results with respect to their predictions and rank the predictors in 280. Such rankings may also be accessible to the prediction consumer interface 260 so that the ranking information may be provided to consumers when they review predictions. In some embodiments, such ranking information may also be used, by a prediction ranking & solicitor 290, which may attach such rankings to the predictions stored in the prediction database 250-2. For example, if a prediction is input from a predictor who is ranked very high, such as five stars, the predictor information associated with the prediction may be marked as such so that the ranking of the predictor is to be displayed together with the prediction, the prompt, and other information when accessed. In some embodiments, such predictor ranking information may also be used in the stage of soliciting predictions. For instance, the prediction input controller 210 may be configured to access predictor rankings so that when there are prompts that need predictions, the controller 210 may solicit, using ranking as a guide, predictions from those predictors who rank high.

Figure 2B:
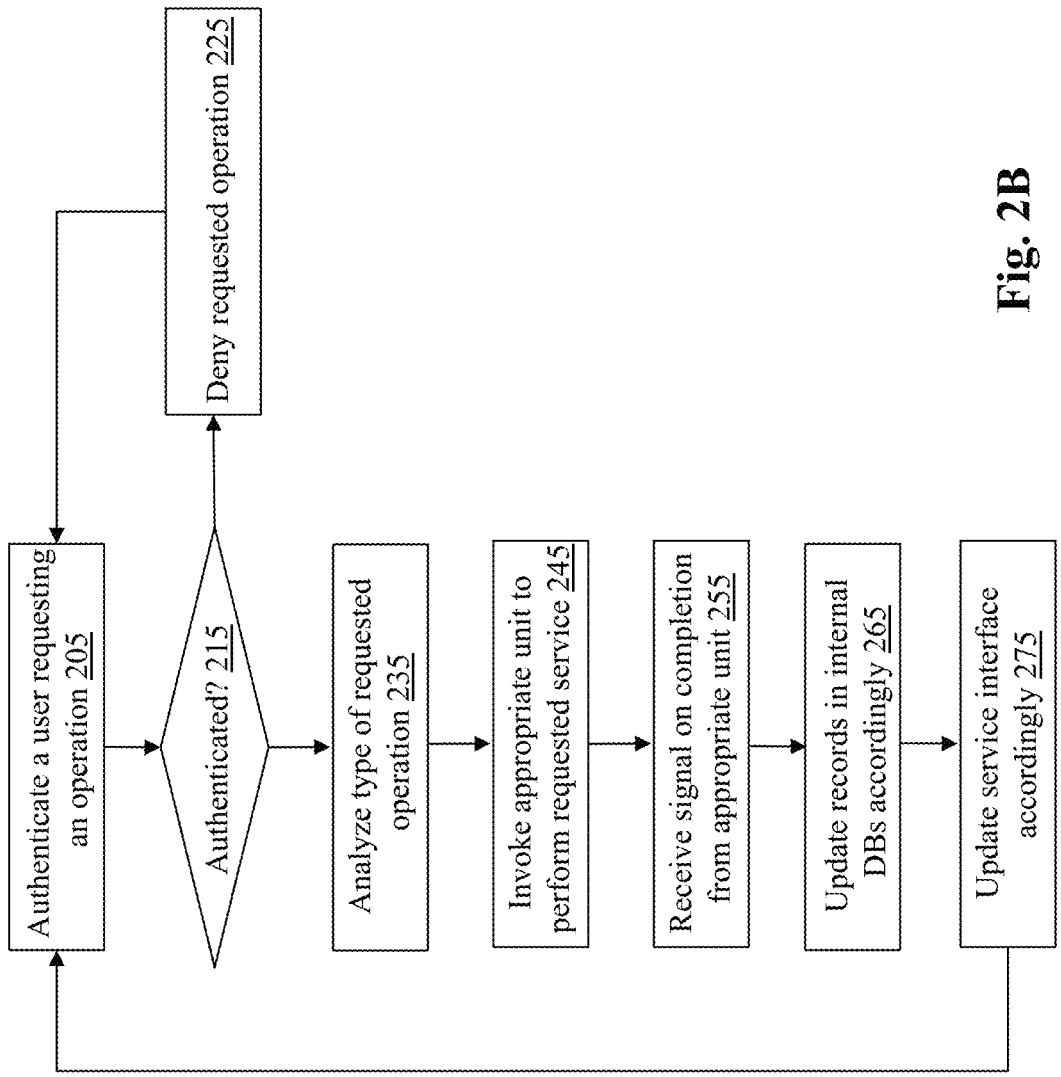
FIG. 2B is a flowchart of an exemplary process of a centralized prediction service engine, in accordance with an embodiment of the present teaching.

FIG. 2B is a flowchart of an exemplary process of the centralized prediction service engine 110, in accordance with an embodiment of the present teaching. When a user's request is received at the prediction service engine 110, the user may first be authenticated at 205. As discussed herein, the authentication may be carried out independently by the prediction service engine 110 internally or against some online communication platform such as Facebook, i.e., the user may need to be a registered user of that online communication platform. When connected with the online communication platform, the prediction service engine 110 may serve as a module attached to the platform to offer prediction related services in the environment supported by the platform. If the requesting user is not authenticated, determined at 215, the requested prediction related service may be denied at 225.

If the user is successfully authenticated, the processing proceeds to step 235, where the request is analyzed as to the type of operation the user asked to perform. As discussed herein, the types of operation may include ones related to prediction soliciting users, ones related to providing predictions to existing prompts, ones for verifying existing predictions, and ones for accessing for consumption predictions made available by the prediction service engine 110. Based on the type of requested operations, the prediction service engine 110 invokes, at 245, appropriate unit to facilitate the operation. Details of this step is further expanded with reference to FIG. 2C. When a signal is received, at 255, from the invoked unit completes the operation, signaling the completion of the requested operation, information in various databases in 250 is updated, at 265, according to the results of the requested operation. Different service interfaces may then be accordingly updated at 275 consistent with the changed content in the databases. For example, if a user requests to enter a prompt, the prediction soliciting interface 200 is invoked to interface with the user to obtain the prompt and the content in the prompt database 250-1 is updated to reflect that there is now one more prompt for which predictions are sought. When the prompt database 250-1 is updated, the prediction input controller 210 may then be updated as well to provide this new prompt to the predicting user interface 220 so that predicting users may elect to provide predictions for it.

Similarly, if the current request is for entering a prediction for a prompt, the predicting user interface 220 is invoked to interact with the user to receive the prediction and the content in the prediction database 250-2 is then updated to include the new prediction for the prompt with information such as the content of the prediction, the predictor's identity, and other materials that may exist to support the prediction. When the prediction database 250-2 is updated, the prediction verification controller 230 may then be activated as well to provide this new prediction associated with a particular prompt to the prediction verifier interface 240 so that the new prediction is now made available for verification users to verify. The process in FIG. 2B continues to repeat to facilitate different users to perform different operations on the prediction service engine 110.

Figure 2C:
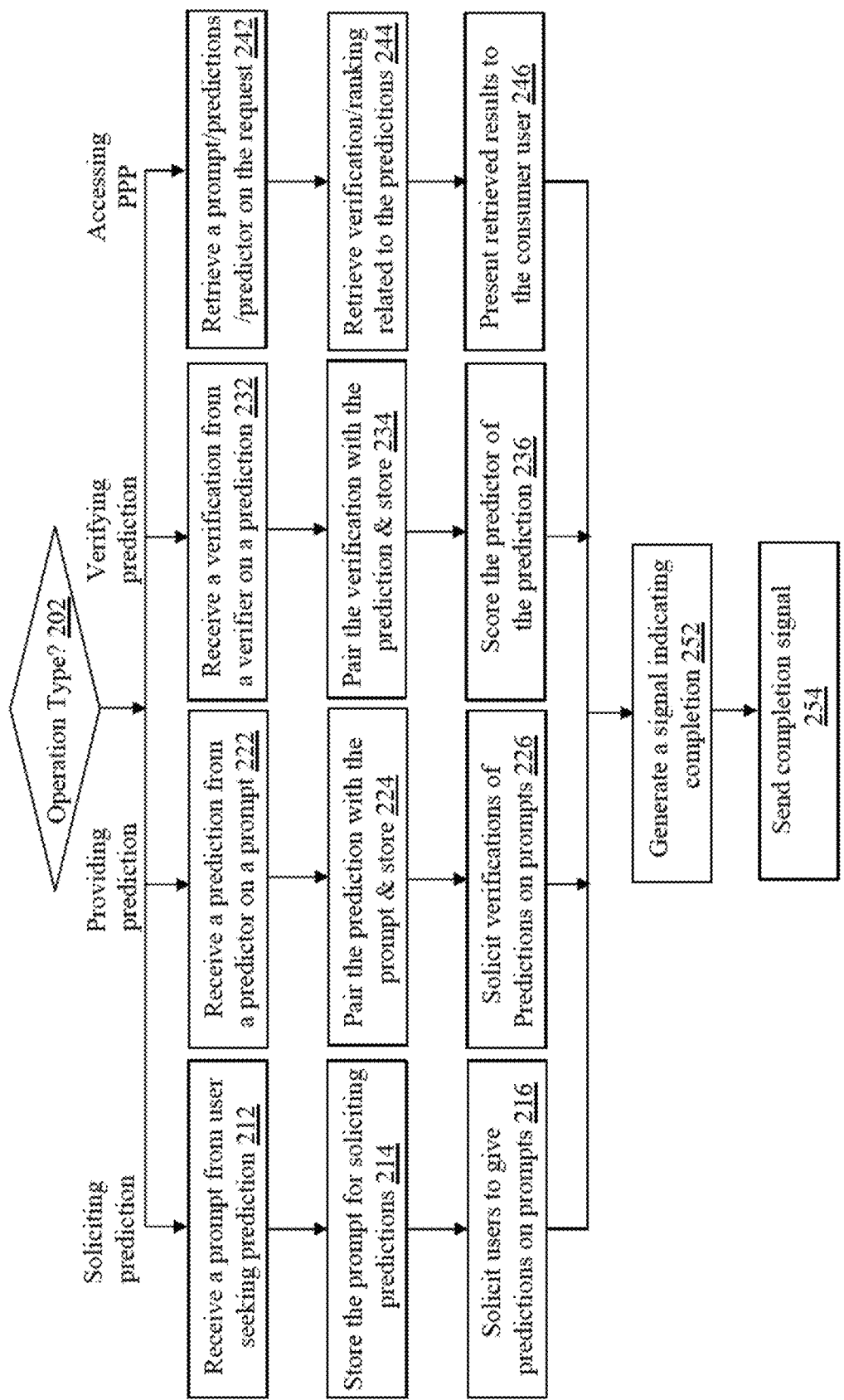
FIG. 2C is a flowchart of an exemplary process for responding to a prediction service request, in accordance with an embodiment of the present teaching.

FIG. 2C is a flowchart of an exemplary process for activating an appropriate unit responding to a specific prediction service request, in accordance with an embodiment of the present teaching. This process details the operations for step 245 in FIG. 2B. The type of operation as requested is first determined at 202. In this exemplary process, there are four types of operations considered, including an operation for soliciting a prediction, an operation for providing a prediction for a prompt, an operation for verifying a prediction, and an operation for accessing a prediction. If the requested operation is for soliciting a prediction, i.e., establishing a prompt for which predictions are sought, the process invokes the prediction soliciting interface 200 that proceeds to receive, at 212, a prompt from the user requesting the operation. The received prompt is then saved, at 214, in the prompt database 250-1 so that it is considered when soliciting predictions. Based on the content in the prompt database 250-1, the prediction input controller 210 is invoked to access updated prompt database 250-1 and provide to the predicting user interface 220 for soliciting, at 216, users to provide predictions to prompts included in the prompt database 250-1.

If the requested operation is for providing predictions for prompts, the predicting user interface is invoked to present existing prompts on the interface so that predicting users may elect to offer their predictions. When the predicting user interface 220 receives, at 222, a prediction from a predictor directed to a prompt, the prediction is stored in the prediction database 250-2, at 224, in a manner that crosses reference (i.e., index against or pair with) the prompt stored in the prompt database 250-1. Based on the updated prediction database 250-2, prediction verification controller 230 is invoked to provide updated prediction information to the prediction verifier interface 240 so that it may solicit, at 226, verification of the predictions, including the new prediction, from verifiers.

If the requested operation is for providing verifications on predictions, the prediction verifier interface 240 is invoked which may make existing predictions available for the user to select from in order to verify. When the prediction verifier interface 240 receives, at 232, verification information from a verifier directed to a prediction, the verification result or associated information is stored in either of the verified prediction database 250-3 or unverified prediction databased 250-4, depending on the verification result, as discussed herein. The archived verification result may be stored at 234, to the appropriate database in a manner that may cross reference (i.e., index against or pair with) with the prediction stored in the prediction database 250-2. Based on the updated verification databases 250-3 or 250-4, statistics stored in the user performance database 250-5 may be updated based on the verification result and the predictor who provided the prediction just verified may then be scored, at 236, accordingly. In some embodiments, the predictor performance evaluator 270 may be optionally invoked to update the predictor rankings 280 based on the updated evaluation of the predictor.

If the requested operation is from a consumer user for accessing prediction related information for consumption, the prediction consumer interface 260 is invoked to receive information on the basis of information retrieval, which may be a prompt (e.g., the consumer user desires to see predictions associated with a particular prompt), a prediction (e.g., the consumer user desires to consume a particular prediction, or a predictor (e.g., consumer user desires to see prediction of a particular predictor), etc. Based on the specified retrieval criteria, the prediction consumer interface 260 retrieves, at 242, from various databases 250 the requested information. As discussed herein, to provide contextual information associated with predictions, verification information, evaluation, or ranking of predictors involved may also be retrieved at 244 and such retrieved prediction related information is then presented, at 246, to the consumer user.

Figure 3A:
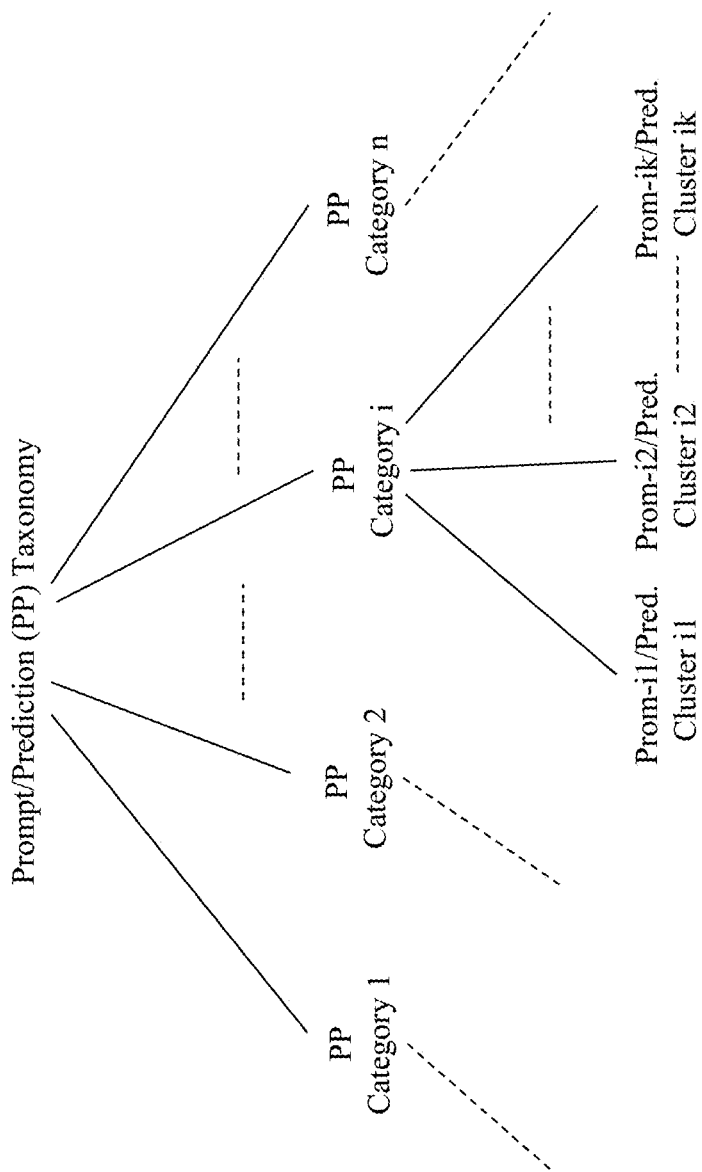
FIG. 3A illustrates exemplary prompt/prediction (PP) taxonomy with multiple categories of PPs, in accordance with an embodiment of the present teaching.

In some embodiments, prompts and their corresponding predictions may be organized as in any other types of content. For instance, as content often is organized according to taxonomy, prediction related data may also be taxonomized based on, e.g., subject matter categories. Given the nature that predictions are usually tied to the prompts, the prediction content may be considered as prompt/predictions (PPs) and such PPs are classified into PP category 1, PP category 2, ..., PP category i, ..., and PP category n. FIG. 3A illustrates such an exemplary prompt/prediction (PP) taxonomy structure with n categories of PPs, in accordance with an embodiment of the present teaching. As illustrated, each PP category may include multiple PP clusters, each of which is directed to one prompt with all of its predictions forming a cluster. The prompts in the same category may be related conceptually. For example, for category "weather," prompts in that category may all be related to some aspects of category "weather." For instance, prompt "tomorrow's tide level in Shanghai," "thunderstorm time tonight in New York City," and "the coldest day in the next 20 days in Boston" may all be in the category of weather. Each of the prompts in one category may have multiple predictions so that the prompt and its predictions form a cluster. As illustrated in FIG. 3A, for PP category i (e.g., category "weather"), there may be multiple clusters, prompt-i1/predictions cluster i1, prompt-i2/predictions cluster i2, ..., prompt-ik/predictions cluster ik, each of which corresponds to one prompt with one or more predictions.

Figure 3B:
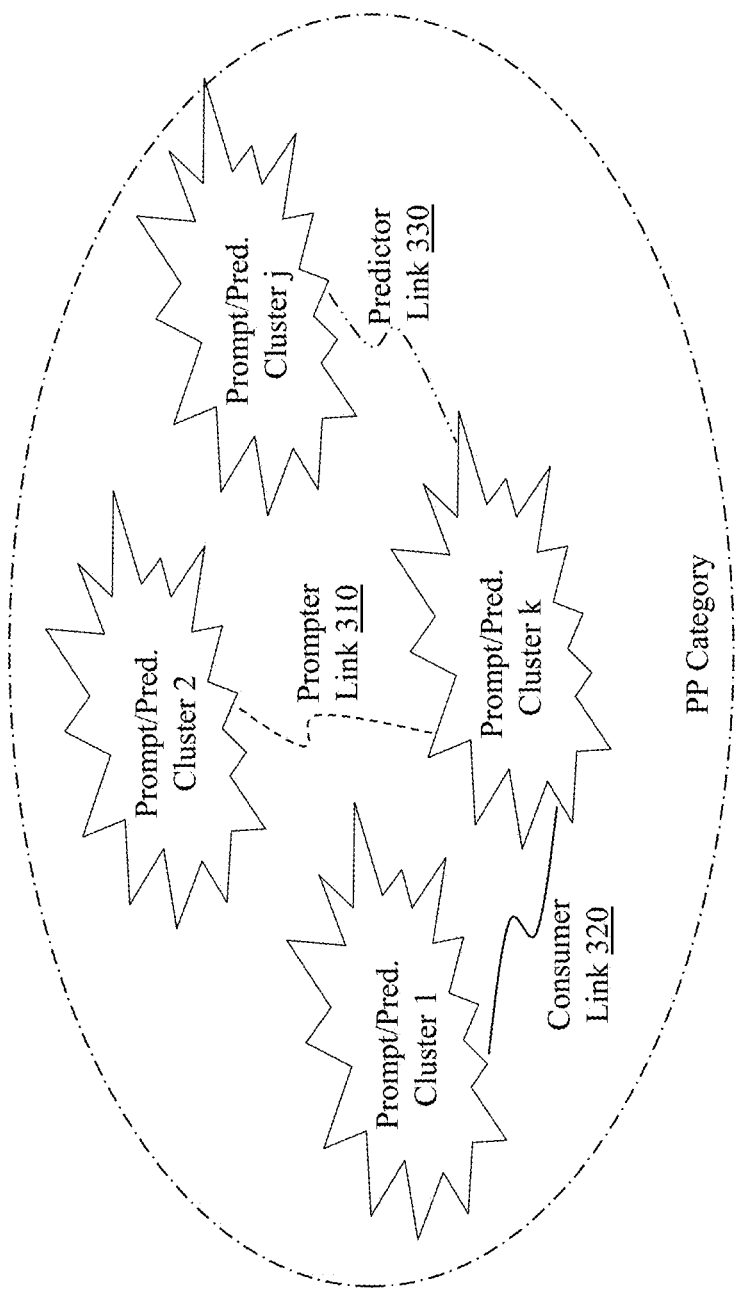
FIG. 3B illustrates an exemplary organization of a PP category with multiple PP clusters, in accordance with an embodiment of the present teaching.

Different prompt/predictions clusters in the same PP category may have some relationships. This is illustrated in FIG. 3B with exemplary organizational structure of different PP clusters within a PP category, in accordance with an embodiment of the present teaching. In this illustration, the PP category with k PP clusters as shown in FIG. 3A is visualized herein and there may be different relationships among these clusters based on operations users perform with respect to these prompts/predictions. For instance, the same predictor may provide predictions to different prompts so that the clusters corresponding to these prompts may be linked via the predictor link 330. The same user may have initiated the multiple prompts in the same category so that different clusters for such prompts may also be linked via a prompter link 310. Different consumers may have shared interests of predictions to different prompts so that clusters for these prompts may be related via a consumer link 320.

Figure 3C:
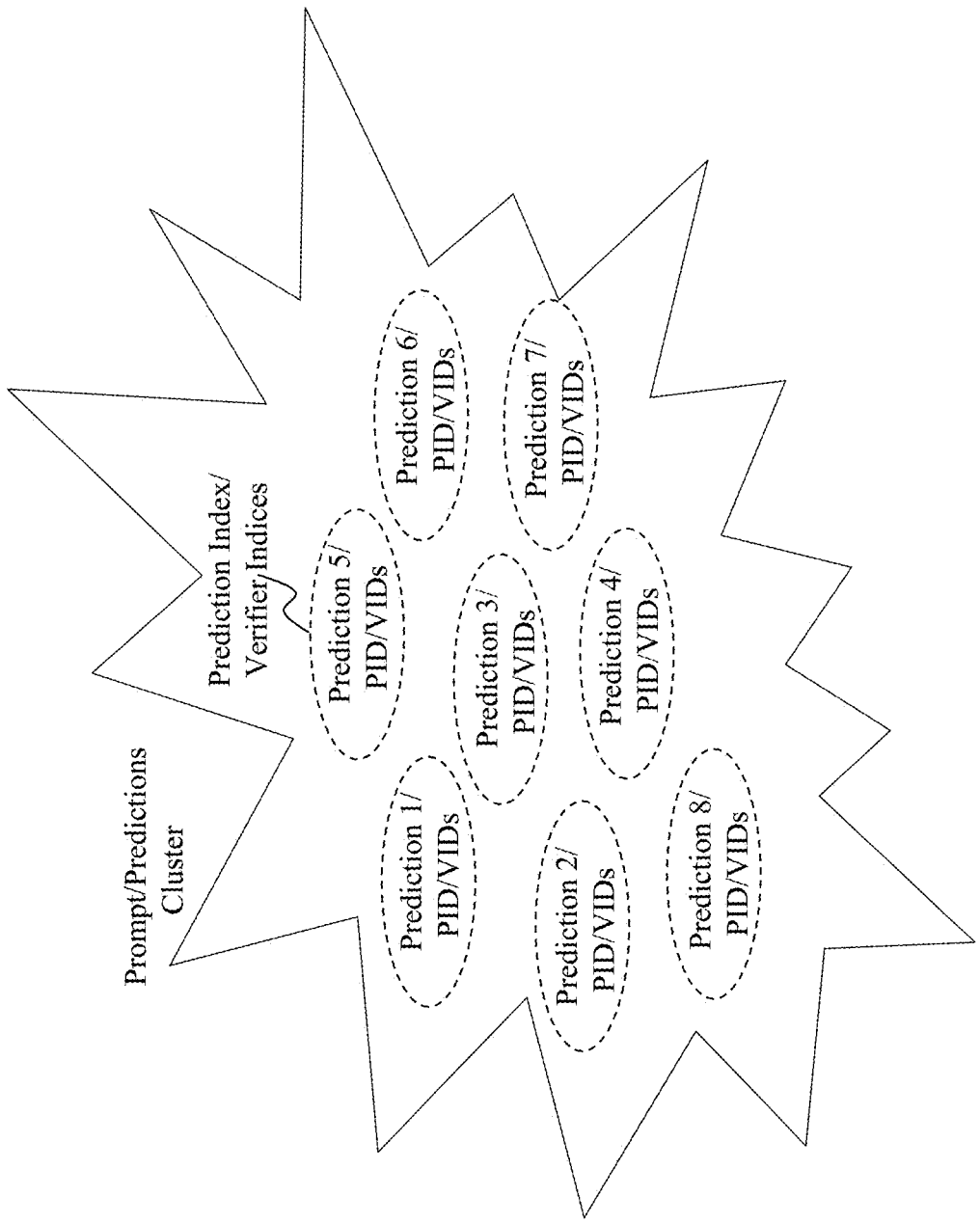
FIG. 3C illustrates an exemplary construct of a PP cluster corresponding to a prediction prompt, in accordance with an embodiment of the present teaching.

FIG. 3C illustrates an exemplary construct of an exemplary PP cluster corresponding to a prediction prompt, in accordance with an embodiment of the present teaching. As discussed herein, each cluster for a prompt may have some predictions provided with respect to the prompt and different predictions may be provided by different predictors and each of the predictions may be verified by one or more verifiers. In the example shown in FIG. 3C, there are eight predictions, predictions 1-8, each of which may be stored as a unit (shown as a dotted ellipse), which includes the prediction itself, an identifier of the predictor, and one or more identifiers of verifiers, if any. As discussed herein, information related to a prompt, and its predictions with predictor identifier(s), and verification result(s) with verifier's identification(s) may be separately stored but cross referenced across the databases. Given that, the logic structure of the clusters, relationships among such clusters, as well as internal organizations of each cluster may be constructed based on, e.g., cross references among data items stored in different databases 250.

Figure 4A:
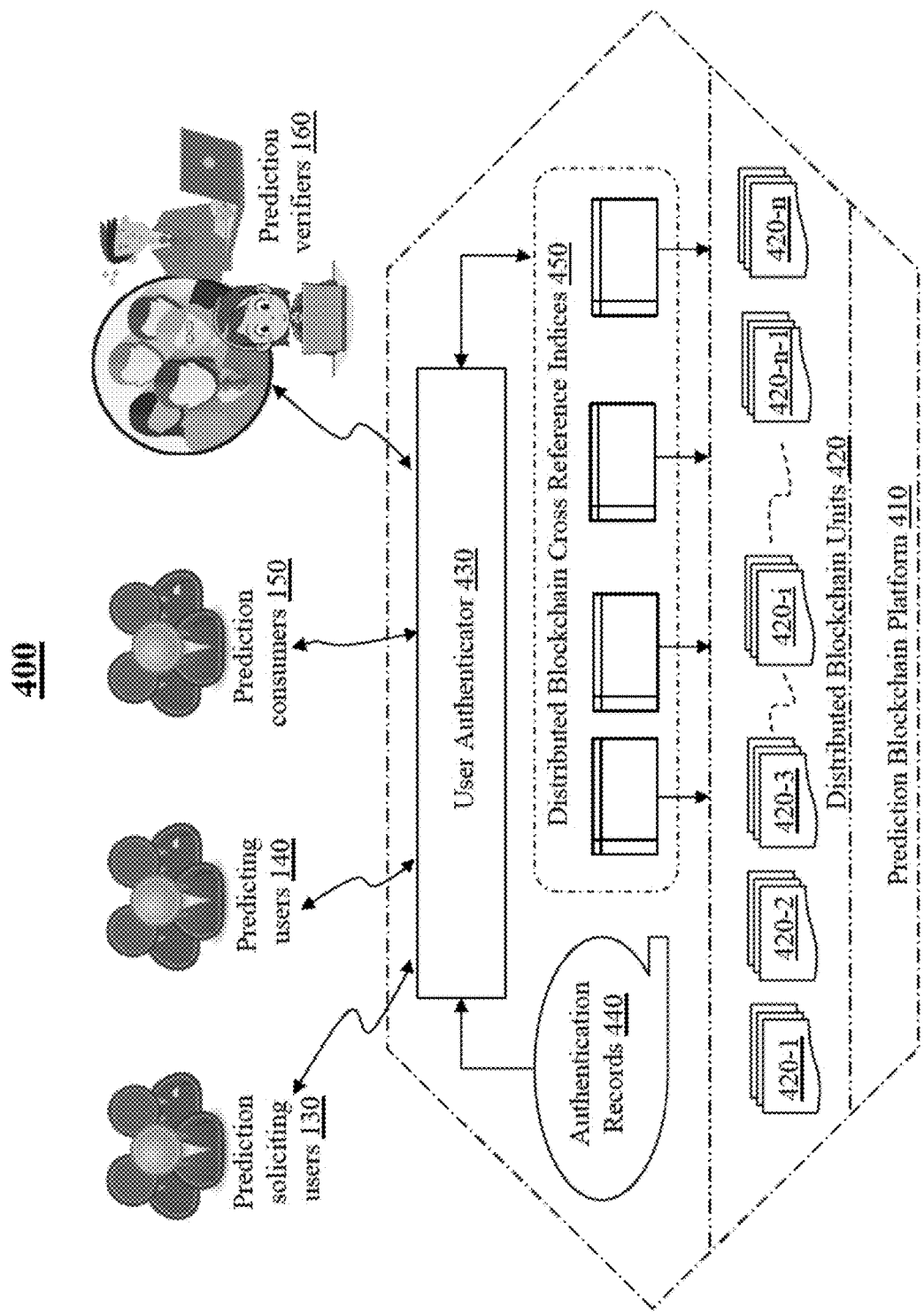
FIG. 4A depicts an exemplary framework for a decentralized prediction service platform via blockchain, in accordance with an embodiment of the present teaching.

Although exemplary organizations of logical data structure are provided in FIGS. 3A-3C, they are merely for illustration instead of limitation. Other data organizations may also be used for implementing the prediction related data within the scope of the present teaching. In addition, these illustrated examples may be related to the centralized prediction related service platform as illustrated in FIG. 2A. In a different embodiment, prediction related services according to the present teaching may also be provided through a decentralized framework. FIG. 4A depicts an exemplary framework 400 for a decentralized prediction service platform, in accordance with an embodiment of the present teaching. Although there may be different ways to realize a decentralized platform, a blockchain architecture is depicted in FIG. 4A for providing prediction related services.

In FIG. 4A, the decentralized framework 400 includes a prediction blockchain platform 410 that interfaces different types of users (similar to what is shown in FIG. 2A, including prediction soliciting users 130, predicting users 140, prediction consumers 150, and prediction verification users 160) via network connections to facilitate different types of users to fulfill different functional roles involved in prediction related operations. In this exemplary embodiment, instead of centralized data storage, retrieval, and manipulation, the prediction blockchain platform 410 comprises a plurality of distributed blockchain units 420 (420-1, 420-2, 420-3, ..., 420-i, ..., 420-n), a user authenticator 430, authentication records 440 for facilitating authentication, and cross reference indices 450 for indexing to distributed blockchain units. Each of the distributed blockchain units 420 may be constructed and operated independently with respect to some well-defined scope of prediction related data. In some embodiments, each of the blockchain unit corresponds to one prompt and handles data creation, operation, maintenance, and access of all predictions associated with the prompt. Each of the blockchain units may have its own interaction mechanism with users so that it independent of other blockchain units.

In some embodiments, the framework 400 in FIG. 4A may provide some centralized operation such as the user authenticator 430 which may interface with a user in order to, e.g., authenticate the identity of the user and direct the user, once authenticated, to one of the appropriate blockchain unit to perform decentralized service-related functionalities. In this case, the framework 400 include authentication records 440 which may be centralized or distributed. To bridge the centralized authentication and decentralized prediction services, the distributed blockchain cross reference indices 450 may be provided to link each user to an independently operating blockchain 420 based on a service request received. In some embodiments, authentication may also be performed in a decentralized manner by each of the blockchain units. In this case, based on each received user request, the distributed blockchain cross reference indices 450 may map the user directly to an appropriate blockchain unit where authentication and requested operations may be managed and achieved.

Figure 4B:
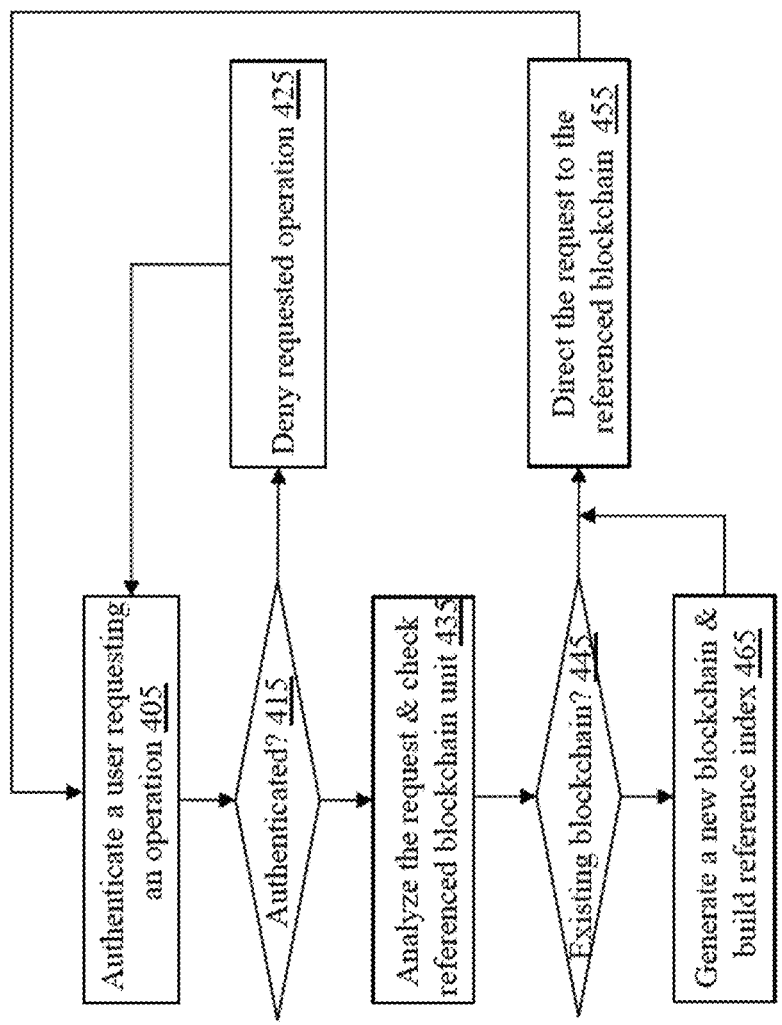
FIG. 4B is a flowchart of an exemplary high-level process for providing decentralized prediction service implemented via blockchain, in accordance with an embodiment of the present teaching.

FIG. 4B is a flowchart of an exemplary process for providing decentralized prediction service implemented via blockchain, in accordance with an embodiment of the present teaching. When a user's request for a prediction related operation is received, the user is authenticated at 405. If the user is not authenticated, determined at 415, the requested operation is denied at 425. If the authentication is successful, the user's request is analyzed, at 435, and cross references to blockchain units are checked. If a blockchain already exists, determined at 445, the user is linked to the referenced blockchain that handles the requested prediction related operation. If there is no existing blockchain unit present, a new blockchain unit is generated, at 465, which may be self-governing for any requested prediction related operations. Once the new blockchain unit is created, the user is linked to the new blockchain unit, at 455, to handle the requested prediction related operation.

Figure 5A:
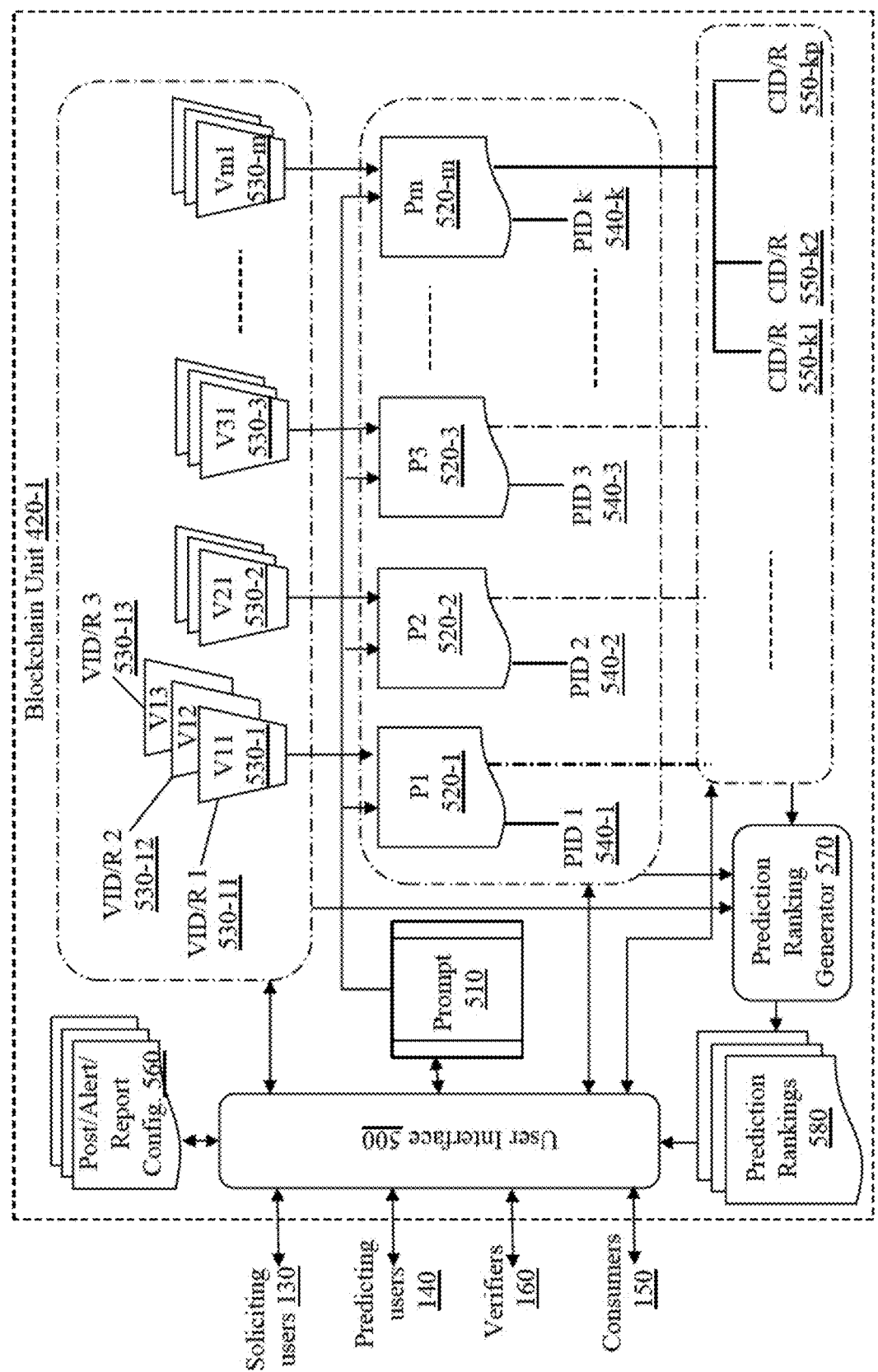
FIG. 5A depicts an exemplary high level system diagram for a blockchain unit constructed and operating to provide prediction services associated with a prompt, in accordance with an exemplary embodiment of the present teaching.

FIG. 5A depicts an exemplary high level system diagram for a blockchain unit 420 constructed and operating to provide prediction related operations/services associated, in accordance with an exemplary embodiment of the present teaching. As discussed herein, each blockchain unit in this exemplary implementation may be to handle data creation, data maintenance, and operations related to prediction related data/services/operations associated with a prompt 510. To appropriately interact with different types of users, the exemplary blockchain unit 420-1 includes a user interface 500 that communicates with a user, ascertains the nature of the requested operation, and constructs accordingly relevant records related to predictions for the prompt 510 and the access thereof.

With respect to prompt 510, there may be one or more predictions 520, including P1 520-1, P2 520-2, P3 520-3, . . . , Pm 520-m. Each of the predictions has an associated PID 540, representing an identifier of the user who contributed the prediction, as well as a list of access records 550, linked to one or more consumer user identifiers or CIDs, representing the consumer users who have accessed the prediction. In some embodiments, each consumer user CID who consumes a prediction may also provide a ranking of the prediction. The consumer ID and the ranking form a record CID/R for each access. Each of the predictions may also have one or more verifications 530. For instance, as illustrated, prediction P1 520-1 is linked to three verifications, e.g., V11 530-1, 530-2, and 530-3, each of which records the content of the verification. As discussed herein, each verification may be recorded with a verifier's identifier VID and a verification result R.

The verification results associated with any prediction may be utilized by a prediction ranking generator 570 to create a ranking to predictions or predictors in 580 and such ranking may be accessed by the user interface 500 so that each prediction and/or predictor may be presented to a user with the ranking information. In some embodiments, such ranking to predictions may also be based on consumer's rankings in CID/R. In some embodiments, configuration may be set to report or alert certain users on arrival of predictions, failure of certain predictions or certain predictors, and the user interface 500 may follow the configuration to report any anticipated information. As discussed herein, in some embodiments, user authentication may also be performed in individual blockchain units (not shown here). In some embodiments, the ranking determined in each blockchain unit may also be communicated to a centralized mechanism (not shown) so that the rankings of certain predictions or predictors may be consolidated to generate a higher level of assessment with more confidence and such globally consolidated evaluation data may also be sent to the individual blockchain units so that they can incorporate such global evaluation information into their local mechanism to provide services to users accessing the prediction related information therein.

Figure 5B:
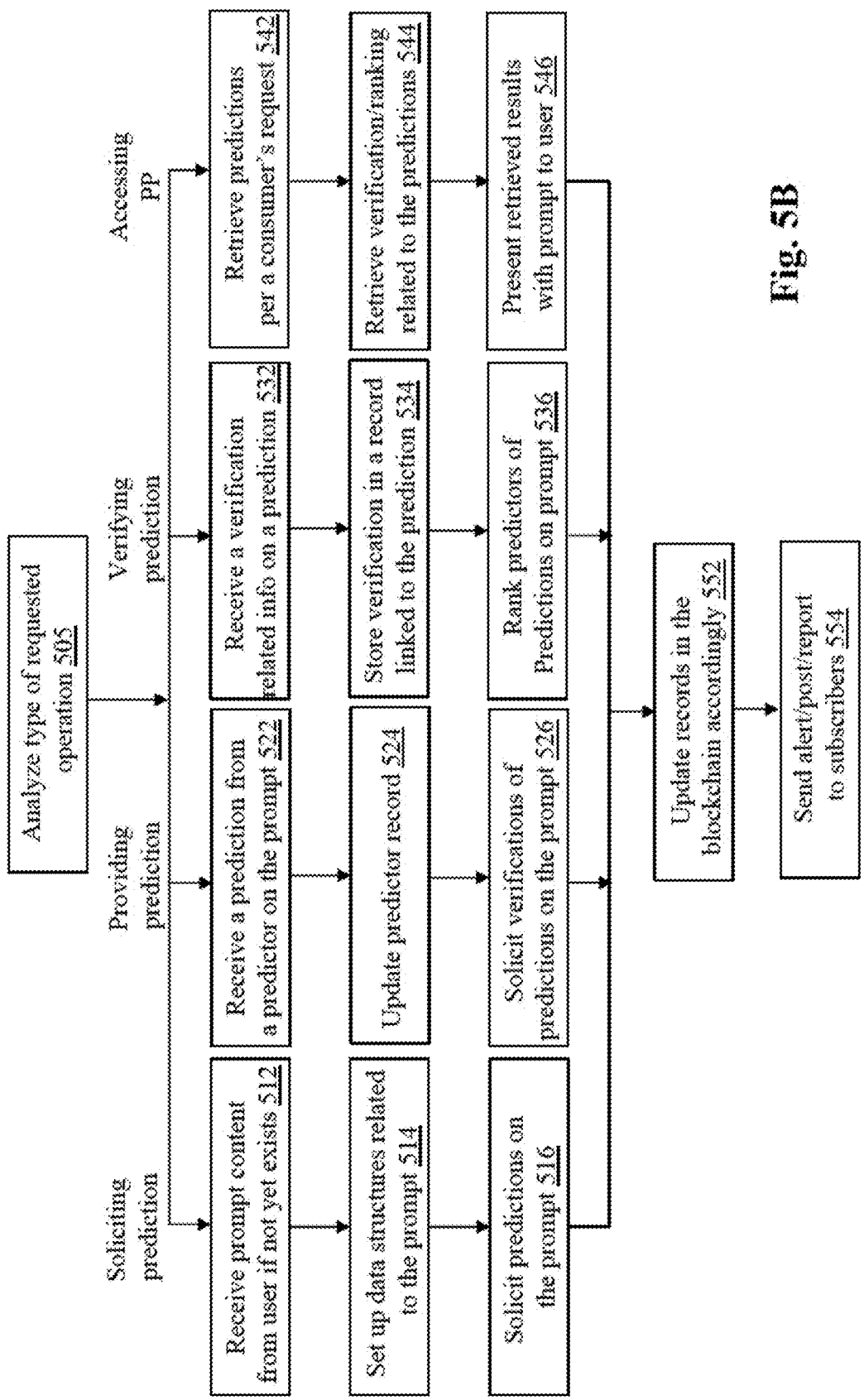
FIG. 5B is a flowchart of an exemplary process of a blockchain unit for providing prediction services associated with a prompt, in accordance with an exemplary embodiment of the present teaching.

As illustrated in FIG. 4A, a user of any type requesting an operation associated with a prompt or its predictions may be directed to a blockchain unit in 420 that handles all operations related to the prompt and its predictions. Upon being directed to a relevant blockchain unit, the user interacts with the user interface embedded in the blockchain unit so that the blockchain unit may determine the service type requested, to facilitate requested services, and updated information related to the prompt and its predictions. This is illustrated in FIG. 5A, where the exemplary blockchain unit 420-1 interacts with different types of users via the user interface 500 and manipulate the prompt related information stored in the blockchain unit to enable the requested operations. FIG. 5B is a flowchart of an exemplary process of blockchain unit 420-1 in providing prediction related services associated with a prompt, in accordance with an exemplary embodiment of the present teaching. When the user interface 500 receives a request from a user on a type of operation to be performed with respect to the prompt 510, the user interface 500 analyzes, at 505, the requested operation and facilitates the operation according to the type of request.

As discussed herein and similarly illustrated in FIG. 2C, there may be four illustrated types of operations requested, including an operation for soliciting a prediction, an operation for providing a prediction for a prompt, an operation for verifying a prediction, and an operation for accessing a prediction. In some embodiments for providing prediction related services via blockchain architecture, each blockchain unit may be responsible for services associated with one prompt, i.e., each blockchain unit stores information related to one PP cluster associated with a prompt (see FIG. 3C). Given that, when a requested operation is for soliciting a prediction, i.e., establishing a prompt for which predictions are sought, the user interface 500 may receive, at 512, a prompt input from the user requesting the operation, if there is not yet prompt stored in the blockchain unit, i.e., the blockchain unit is newly created for a new prompt. If prompt 510 is already present in blockchain unit, the requested service to set up a prompt may be denied.

Although in this example, each blockchain unit handles prediction related services associated with a single prompt, it is merely for illustration that the scope of service provided by a blockchain unit is well defined and services outside of the scope may be provided by one or more other blockchain units distributed elsewhere. This illustrated scheme should not be used as a limitation as to the scope of the present teaching. For example, a blockchain unit may also be implemented to provide predictions related data and services associated with one PP category with multiple prompts and their associated predictions (see FIG. 3B).

Based on the received prompt, data structures for information related to the prompt may be created at 514, which may include, e.g., a data structure 540 for prediction related information, a data structure 530 for verification related information, a data structure 550 for consumption related information, ranking archive storage 580, and optionally a configuration 560 related to post/alert/reporting related set up information. Such data structures may be initially set up with a start size or organization but the blockchain unit is configured to be able to dynamically grow and manage the changing sizes according to needs. Based on the received prompt, the user interface 500 may present the prompt in order to solicit, at 516, predictions for the prompt.

If the requested operation is for providing predictions for prompt 510, the user interface 500 interacts with the user to receive, at 522, a prediction from the predicting user and accordingly update, at 524, the prediction information in the prediction data structure. The update to the prediction data structure may include storing the content of the prediction in 520 as well as information related to the predictor such as identifier PID in 540. In some embodiments, the update to the prediction related record may also include to set up a consumption record 550 linked to the newly stored prediction. In some embodiments, based on the newly set up prediction may also trigger to set up another record in the verification data structure to link to the new prediction so that information related to any future verification may be linked. Once the new records in appropriate data structures are created for future entries, the user interface 500 may then include the new prediction for the prompt on its display for soliciting, at 526, verifications on the prediction.

If the requested operation is for providing a verification on one of the existing predictions directed to the prompt 510, the user interface 500 receives, at 532, information from a verifier user directed to a prediction, which may include the verification itself as well as, e.g., the identifier of the verifier user for record. The received verification related information may then be stored, at 534, in a record linked to the prediction verified in data structure 530. Such recorded information may be later used by, e.g., the prediction ranking generator 570 to generate, at 536, rankings 580 on either the predictions or predictors.

If the requested operation is from a consumer user for accessing prediction related information for consumption, the user interface 500 may interacts with the consumer user to understand the needs. In some embodiments, it is possible that instead of accessing all predictions associated with prompt 510, a user may be interested in reviewing the predictions from particular predictors. In some situations, a consumer user may also be interested in only verifications from a particular source. Based on such specification from the consumer user, the user interface 500 may retrieve predictions of interest at 542 and verifications as specified at 544. In some embodiments, as discussed herein, certain ranking information associated with the desired predictions with, optionally certain interested verifications, may also be retrieved and to be presented, at 546, together with the desired predictions and associated verification information.

Although only four type of operations are illustrated above, there may be other types of operations that a user may request a blockchain unit to perform (not shown in FIGS. 5A-5B). Such a user may be an individual user or another service or an application. For instance, another application may request to obtain ranking information stored in 580 so that the application may consolidate rankings collected from different blockchain units to come up with an overall ranking on, e.g., predictors. Such consolidated predictor ranking information may then be distributed to blockchain units so that when appropriate, ranking of a predictor may be provided to a consumer user who accesses a prediction made by the same predictor. In some embodiments, a consumer user may also configure a blockchain unit handling an interested prompt to post any predictions that are received by the blockchain unit. For instance, assume that prompt 510 is "what is the chance of rain tomorrow between 5:00 pm-6:30 pm." In this case, predictions may be received everyday (because the prompt does not place a limit on the day) so that a user may set up the blockchain unit for this prompt to send an alert before 4:00 pm each day whenever a prediction is received. In this case, the request for daily alert may be configured in 560 and the user interface 500 may send an alert to the user according to the configuration specified.

Upon a request being handled in accordance with the above procedure, appropriate records in the blockchain unit may then be updated accordingly at 552. This may include that based on the updated information in the data structures 540, 530, and 550, the information to be presented at the user interface 500 may also be updated. For example, if one more prediction is added for the prompt, the predictions to be displayed on the user interface 500 may also include the new prediction so that verification for this new prediction may also be invited. As another example, if a new verification is provided with respect to a prediction, information related to the new verification may also be displayed on the user interface in connection with the prediction to which the verification is directed. Similarly, the newly completed service may also trigger to send, at 554, an alert, post a new prediction, or report a new verification, if it fits the scenario, to a user who subscribed to receive such an alert, a post, or a report in accordance with a specification as provided in 560.

Although the service items may be similarly provided through the use of blockchain units in the decentralized service platform, the use of such decentralized platform may improve the security, privacy, accessibility, and fault tolerance as compared with the centralized prediction related services. In any implementation, a centralized, a decentralized, or a mixed (centralized mixed with decentralized) platform may be implemented to provide prediction related services to users, either in an independent environment or in a setting attached to an existing social media circle.

Figure 6:
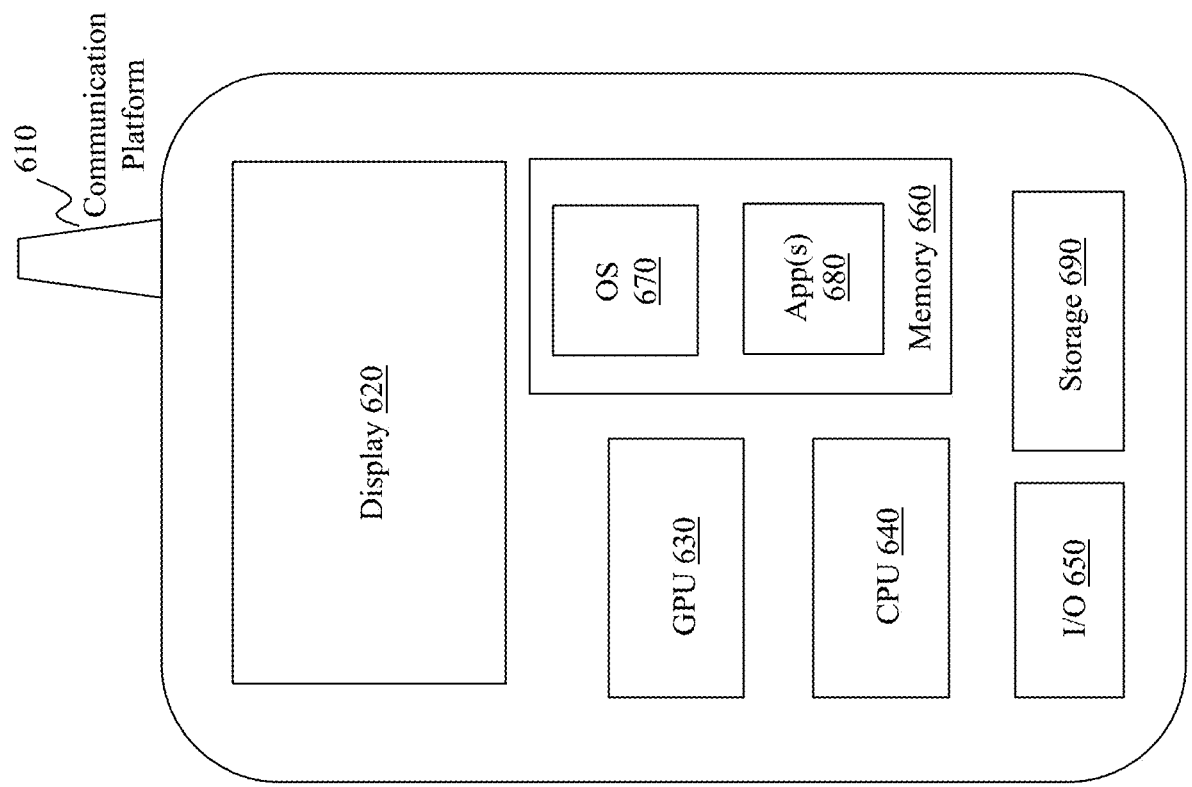
FIG. 6 is an illustrative diagram of an exemplary mobile device architecture that may be used to realize a specialized system implementing the present teaching in accordance with various embodiments.

FIG. 6 is an illustrative diagram of an exemplary mobile device architecture that may be used to realize a specialized system implementing the present teaching in accordance with various embodiments. In this example, the user device on which the present teaching may be implemented corresponds to a mobile device 600, including, but not limited to, a smart phone, a tablet, a music player, a handled gaming console, a global positioning system (GPS) receiver, and a wearable computing device, or in any other form factor. Mobile device 600 may include one or more central processing units ("CPUs") 640, one or more graphic processing units ("GPUs") 630, a display 620, a memory 660, a communication platform 610, such as a wireless communication module, storage 690, and one or more input/output (I/O) devices 650. Any other suitable component, including but not limited to a system bus or a controller (not shown), may also be included in the mobile device 600. As shown in FIG. 6, a mobile operating system 670 (e.g., iOS, Android, Windows Phone, etc.), and one or more applications 680 may be loaded into memory 660 from storage 690 in order to be executed by the CPU 640. The applications 680 may include a user interface or any other suitable mobile apps for information analytics and management according to the present teaching on, at least partially, the mobile device 600. User interactions, if any, may be achieved via the I/O devices 650 and provided to the various components connected via network(s).

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar with to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

FIG. 7 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general-purpose computer or a special purpose computer. Both can be used to implement a specialized system for the present teaching. This computer 700 may be used to implement any component or aspect of the framework as disclosed herein. For example, the information analytical and management method and system as disclosed herein may be implemented on a computer such as computer 700, via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 700, for example, includes COM ports 750 connected to and from a network connected thereto to facilitate data communications. Computer 700 also includes a central processing unit (CPU) 720, in the form of one or more processors, for executing program instructions. The exemplary computer platform includes an internal communication bus 710, program storage and data storage of different forms (e.g., disk 770, read only memory (ROM) 730, or random-access memory (RAM) 740), for various data files to be processed and/or communicated by computer 700, as well as possibly program instructions to be executed by CPU 720. Computer 700 also includes an I/O component 760, supporting input/output flows between the computer and other components therein such as user interface elements 780. Computer 700 may also receive programming and data via network communications.

Hence, aspects of the methods of information analytics and management and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming. All or portions of the software may at times be communicated through a network such as the Internet or various other telecommunication networks. Such communications, for example, may enable loading of the software from one computer or processor into another, for example, in connection with information analytics and management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution, e.g., an installation on an existing server. In addition, the techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method implemented on at least one processor, a memory, and a communication platform for communication, comprising:

creating a communication chain comprising a plurality of chain units, each of which operates independently to provide a different prediction service associated with a prediction generated for a prompt, wherein the plurality of chain units form the communication chain, providing prediction services for different aspects of a prediction, including soliciting a prediction with respect to a prompt, providing a prediction for a prompt, verifying a prediction, and facilitating access to a prediction;

receiving a request for a requested prediction operation relating to one of the aspects of the prediction services associated with a query prompt, wherein the requested operation is directed to one of soliciting a prediction, providing a prediction, verifying a prediction, and accessing a prediction;

if one of the plurality of chain units corresponds to the query prompt, directing the request to the chain unit for carrying out the requested operation; and if none of the plurality of chain units is associated with query prompt, creating an additional chain unit for the query prompt, adding the additional chain unit to the communication chain to create an updated communication chain, and directing the request to the additional chain unit in the updated communication chain for carrying out the requested operation.

2. The method of claim 1, wherein the communication chain corresponds to a blockchain; and each of the plurality of chain units corresponding to a prompt in the blockchain is fully functional in providing the prediction services related to the prompt.

3. The method of claim 1, wherein the soliciting a prediction with respect to a prompt involves:

receiving the query prompt from a prediction soliciting user;

storing the query prompt received in the chain unit; and presenting the query prompt on an interface of the chain unit associated with the query prompt in order to solicit a prediction directed to the query prompt.

4. The method of claim 1, wherein each of the plurality of chain units includes embedded information associated with one or more predictions to facilitate the prediction services, and the providing a prediction involves:

receiving a prediction from a predicting user directed to the query prompt;

storing the received prediction with the embedded information; and presenting the received prediction on an interface of the chain unit associated with the query prompt in order to solicit verification on the prediction, wherein the received prediction includes content of the prediction and an identifier of the predicting user.

5. The method of claim 1, wherein each of the plurality of chain units includes embedded information associated with one or more predictions to facilitate the prediction services, and the verifying a prediction involves:

receiving verification information from a verifying user directed to one of the one or more predictions associated with the query prompt, wherein the verification information includes an indication of the prediction for which the verification is provided, a verification result, and an identifier of the verifying user; and storing the verification information in the embedded information in connection with the prediction.

6. The method of claim 1, wherein the facilitating access to a prediction involves:

receiving consumption specification from a consumer user wherein the consumption specification is indicative of an interested prediction service;

retrieving, from the embedded information in the chain unit, service information consistent with the interested prediction service; and presenting the retrieved service information to the consumer user to deliver the requested interested prediction service.

7. The method of claim 5, wherein each of the plurality of chain units includes embedded information associated with one or more predictions to facilitate the prediction services, and the method further comprising at least one of:

incorporating evaluation information in the embedded information by generating rank data associated with the one or more predictions or corresponding predicting users based on verification information directed thereto, storing the rank data with embedded information with respect to each of the one or more predictions or the corresponding predicting users; and sending at least some of the embedded information to a user according to an alert configuration set up by the user, wherein the alert configuration specifies at least one condition that triggers the sending.

8. A machine readable and non-transitory medium having information recorded thereon for communication, wherein the information, once read by the machine, causes the machine to perform the following steps:

creating a communication chain comprising a plurality of chain units, each of which operates independently to provide a different prediction service associated with a prediction generated for a prompt, wherein the plurality of chain units form the communication chain, providing prediction services for different aspects of a prediction, including soliciting a prediction with respect to a prompt, providing a prediction for a prompt, verifying a prediction, and facilitating access to a prediction;

receiving a request for a requested prediction operation relating to one of the aspects of the prediction services associated with a query prompt, wherein the requested operation is directed to one of soliciting a prediction, providing a prediction, verifying a prediction, and accessing a prediction;

if one of the plurality of chain units corresponds to the query prompt, directing the request to the chain unit for carrying out the requested operation; and if none of the plurality of chain units is associated with the query prompt, creating an additional chain unit for the query prompt, adding the additional chain unit to the communication chain to create an updated communication chain, and directing the request to the additional chain unit in the updated communication chain for carrying out the requested operation.

9. The medium of claim 8, wherein the communication chain corresponds to a blockchain; and each of the plurality of chain units corresponding to a prompt in the blockchain is fully functional in providing the prediction services related to the prompt.

10. The medium of claim 8, wherein the soliciting a prediction with respect to a prompt involves:

receiving the query prompt from a prediction soliciting user;

storing the query prompt received in the chain unit; and presenting the query prompt on an interface of the chain unit associated with the query prompt in order to solicit a prediction directed to the query prompt.

11. The medium of claim 8, wherein each of the plurality of chain units includes embedded information associated with one or more predictions to facilitate the prediction services, and the providing a prediction involves:
receiving a prediction from a predicting user directed to the query prompt;
storing the received prediction with the embedded information; and
presenting the received prediction on an interface of the chain unit associated with the query prompt in order to solicit verification on the prediction, wherein
the received prediction includes content of the prediction and an identifier of the predicting user.

12. The medium of claim 8, wherein each of the plurality of chain units includes embedded information associated with one or more predictions to facilitate the prediction services, and the verifying a prediction involves:
receiving verification information from a verifying user directed to one of the one or more predictions associated with the query prompt, wherein the verification information includes an indication of the prediction for which the verification is provided, a verification result, and an identifier of the verifying user; and
storing the verification information in the embedded information in connection with the prediction.

13. The medium of claim 8, wherein facilitating access to a prediction involves:
receiving consumption specification from a consumer user wherein the consumption specification is indicative of an interested prediction service;
retrieving, from the embedded information in the chain unit, service information consistent with the interested prediction service; and
presenting the retrieved service information to the consumer user to deliver the requested interested prediction service.

14. The medium of claim 12, wherein each of the plurality of chain units includes embedded information associated with one or more predictions to facilitate the prediction services, and wherein the information, once read by the machine, further causes the machine to perform at least one of:
incorporating evaluation information in the embedded information by
generating rank data associated with the one or more predictions or corresponding predicting users based on verification information directed thereto,
storing the rank data with embedded information with respect to each of the one or more predictions or the corresponding predicting users; and
sending at least some of the embedded information to a user according to an alert configuration set up by the user, wherein the alert configuration specifies at least one condition that triggers the sending.

15. A system, comprising:
a communication chain comprising a plurality of chain units, each of which operates independently to provide a different prediction service associated with a prediction generated for a prompt, wherein the plurality of chain units form the communication chain, providing prediction services for different aspects of a prediction, including soliciting a prediction with respect to a prompt, providing a prediction for a prompt, verifying a prediction, and facilitating access to a prediction; and a prediction service platform implemented by a processor and configured for
receiving a request for a requested prediction operation relating to one of the aspects of the prediction services associated with a query prompt, wherein the requested operation is directed to one of soliciting a prediction, providing a prediction, verifying a prediction, and accessing a prediction,
if one of the plurality of chain units corresponds to the query prompt, directing the request to the chain unit for carrying out the requested operation, and
if none of the plurality of chain units is associated with query prompt,
creating an additional chain unit for the query prompt,
adding the additional chain unit to the communication chain to create an updated communication chain, and
directing the request to the additional chain unit in the updated communication chain for carrying out the requested operation.

16. The system of claim 15, wherein the prediction service platform further comprises a user interface for handling the soliciting a prediction with respect to a prompt by:
receiving the query prompt from a prediction soliciting user;
storing the query prompt received in the chain unit; and
presenting the query prompt on an interface of the chain unit associated with the query prompt in order to solicit a prediction directed to the query prompt.

17. The system of claim 15, wherein each of the plurality of chain units includes embedded information associated with one or more predictions to facilitate the prediction services, and wherein the prediction service platform further comprises a user interface for handling providing a prediction by:
receiving a prediction from a predicting user directed to the query prompt;
storing the received prediction with the embedded information; and
presenting the received prediction on an interface of the chain unit associated with the query prompt in order to solicit verification on the prediction, wherein
the received prediction includes content of the prediction and an identifier of the predicting user.

18. The system of claim 15, wherein each of the plurality of chain units includes embedded information associated with one or more predictions to facilitate the prediction services, and the prediction service platform further comprises a user interface for handling the verifying a prediction by:
receiving verification information from a verifying user directed to one of the one or more predictions associated with the query prompt, wherein the verification information includes an indication of the prediction for which the verification is provided, a verification result, and an identifier of the verifying user; and
storing the verification information in the embedded information in connection with the prediction.

19. The system of claim 15, wherein the prediction service platform further comprises a user interface for handling facilitating access to a prediction by:
receiving consumption specification from a consumer user wherein the consumption specification is indicative of an interested prediction service;
retrieving, from the embedded information in the chain unit, service information consistent with the interested prediction service; and presenting the retrieved service information to the consumer user to deliver the requested interested prediction service.

20. The system of claim 18, wherein each of the plurality of chain units includes embedded information associated with one or more predictions to facilitate the prediction services, and wherein the prediction service platform further comprises a prediction ranking generator implemented by a processor and configured for:
- incorporating evaluation information in the embedded information by
- generating rank data associated with the one or more predictions or corresponding predicting users based on verification information directed thereto,
- storing the rank data with embedded information with respect to each of the one or more predictions or the corresponding predicting users; and
- a user interface implemented by a processor and configured for sending at least some of the embedded information to a user according to an alert configuration set up by the user, wherein the alert configuration specifies at least one condition that triggers the sending.

* * * * *